United States Patent Office 2,814,623
Patented Nov. 26, 1957

2,814,623
CERTAIN ESTERS OF N-METHYL SCOPOLAMINE QUATERNARY AMMONIUM SALTS
Robert B. Moffett, Kalamazoo Township, Kalamazoo County, Mich., assignor to The Upjohn Company, Kalamazoo, Mich., a corporation of Michigan
No Drawing. Application December 5, 1955, Serial No. 550,837
8 Claims. (Cl. 260—292)

This invention relates to new organic compounds and is more particularly directed to new esters of N-methyl scopolamine quaternary ammonium salts.

The novel compounds according to the invention, can for the most part, be represented by the following general formula:

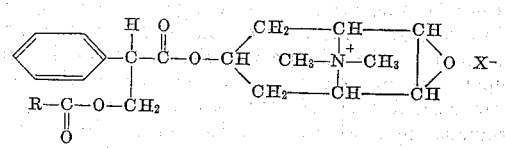

wherein R is selected from the group consisting of lower alkyl, lower cycloalkylalkyl and lower alkoxyalkyl and X is a pharmacologically acceptable anion. The term "lower" is used to designate not more than seven carbon atoms.

It is an object of the invention to provide novel and useful esters of N-methyl scopolamine quaternary ammonium salts. Another object of this invention is the provision of novel and useful esters of N-methyl scopolamine quaternary ammonium halides. Other objects of this invention will be apparent to those skilled in the art to which the invention pertains.

O-acetyl scopolamine, also known as acetylhyoscine, and its hydrobromide were reported by O. Hesse, J. prakt. chem. 64, 353 (1901). The Australian Patent 161,252, and the corresponding German patent application D. 15,048, 12 p., 13, opened for inspection on July 28, 1955, disclose the preparation of the acid addition salts of certain alkanoyl esters of scopolamine; namely, the acetyl, propionyl, n-butyryl, valeryl and benzoyl esters.

It has now been found in accordance with this invention that the novel esters of N-methyl scopolamine quaternary ammonium salts possess a combination of unexpected and highly useful therapeutic properties; specifically, a combination of high antisecretory and high antispasmodic activity in conjunction with relatively low toxicity and a lack of any appreciable action on the central nervous system. This is a highly advantageous superiority over the properties of the esters of scopolamine and their acid addition salts which adversely affect the central nervous system. The novel compounds of this invention are preferably prepared from acid addition salts of scopolamine by the following reaction scheme:

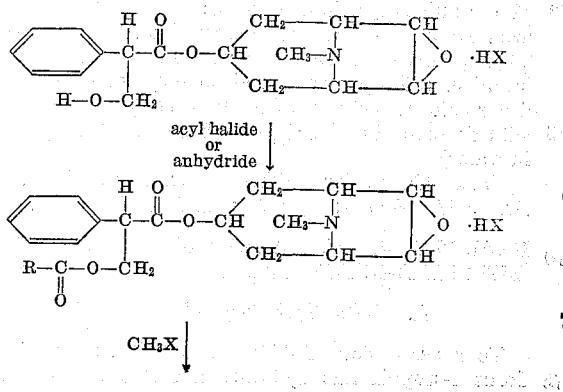

R and X are as defined above.

The starting materials for the invention include the various acid addition salts of scopolamine, such as the hydrobromide, hydrochloride, hydroiodide, nitrate, sulfate, and the like, and the hydrates of these compounds. Instead of an acid addition salt, the free scopolamine base may be used.

The starting compounds are reacted with the appropriate acyl halide or anhydride to form the desired corresponding acyl ester of the scopolamine or its acid addition salt. If the acylation is carried out in an alkaline medium, the free acyl scopolamine is obtained, which then, if desired, can be converted by treatment with an acid to its acid addition salt. If the acylation is carried out under acid conditions, the acid addition salt of the acyl scopolamine will be obtained; this can be converted to the free base by reaction with an alkali. The free base is then converted to the N-methyl scopolamine quaternary ammonium salt by reaction with a methyl derivative of a pharmacologically acceptable anion, such as methyl bromide, methyl chloride, methyl iodide, dimethyl sulfate, and the like. Since the pharmacological activity of the N-methyl scopolamine quaternary ammonium salt is due to the cation, any anion which is pharmacologically acceptable (see U. S. Patent 2,708,651) can be used. The data given in the following table is illustrative of the pharmacological effect shown by the compounds of this invention. The toxicities of the compounds were determined by intraperitoneal administration to mice and are expressed as $LD_{50}$ in milligrams per kilogram. The antispasmodic index values were determined by intravenous injection to Thiry-Vella dogs and equated to atropine sulfate equals 1.0 (low values mean low activity). The gastric antisecretory activity values were determined intravenously in pyloric ligation rats and are expressed as the $ED_{50}$ in milligrams per kilogram, the effective dose necessary to reduce gastric secretion by fifty percent (low values mean high activity).

| Compound | Toxicity $LD_{50}$ | Antispasmodic index | Antisecretory activity |
|---|---|---|---|
| O-acetyl 1-scopolamine methyl bromide | 167 | 6.0 | 0.004 |
| O-(α-ethoxypropionyl)-1-scopolamine methyl bromide | 200 | 2.0 | 0.008 |
| O-trimethylacetyl 1-scopolamine methyl bromide | 77 | 2.0 | 0.005 |
| O-(β-cyclopentylpropionyl)-1-scopolamine methyl bromide | 167 | 0.3 | 0.007 |
| O-(α-ethylisovaleryl)-1-scopolamine methyl bromide | 65 | 0.2 | 0.05 |

The invention may now be more fully understood by referring to the following examples which are illustrative of the novel compounds of the invention and their preparation, but are not to be construed as limiting.

EXAMPLE 1.—PREPARATION OF O-ACETYL 1-SCOPOLAMINE METHYL BROMIDE

A. *O-acetyl 1-scopolamine hydrobromide*

A mixture of fifty grams of 1-scopolamine hydrobromide trihydrate and 200 milliliters of acetic anhydride was heated on a steam bath with stirring for one and one-half hours. The starting material all dissolved during the heating and then the product started to crystallize. After cooling, the crystals were collected, washed with acetic acid and ether and dried, giving a yield of 47.9 grams (98 percent) of O-acetyl 1-scopolamine hydrobromide, $[\alpha]_D^{23}$ −26 degrees (1.4 percent in water), melting point 197–199 degrees centigrade (reported melting point 189.5–190 degrees centigrade). A mixed melting point with dried 1-scopolamine hydrobromide (melting point 199–201 degrees centigrade) gave a large depression (mixed melting point 175–180 degrees centigrade).

*Anal.*—Calcd. for $C_{19}H_{24}BrNO_5$: C, 53.53; H, 5.67; Br, 18.75. Found: C, 53.66; H, 5.68; Br, 18.37.

B. *O-acetyl 1-scopolamine methyl bromide*

A mixture of 37.2 grams (0.0895 mole) of the O-acetyl 1-scopolamine hydrobromide and 95.5 milliliters (0.0895 mole) of ten percent sodium carbonate in ice water was extracted with ether. Then twenty milliliters more of the ten percent sodium carbonate solution was added and the aqueous solution was again extracted with ether. It was then made strongly basic with sodium hydroxide and extracted a third time with ether. The ether solutions were combined, washed with water and saturated sodium chloride solution and dried over sodium sulfate. The ether solution was concentrated under reduced pressure to about 170 milliliters, cooled, and 33 grams (0.347 mole) of methyl bromide was added. An oil soon separated which had mostly crystallized after five days. The product, O-acetyl 1-scopolamine methyl bromide, was collected and recrystallized from isopropyl alcohol giving 22 grams (55 percent) of silky needles, $[\alpha]_D^{23}$ −24 degrees (0.873 percent in water). In a melting point tube it sintered at 142–3 degrees centigrade and then resolidified and melted with decomposition at 183–190 degrees centigrade. On the Fisher-Johns block it melted at 160–161 degrees centigrade and then resolidified and melted again at 194–196 degrees centigrade.

*Anal.*—Calcd. for $C_{20}H_{26}BrNO_5$: C, 54.53; H, 5.95; Br, 18.15. Found: C, 54.63; H, 5.67; Br, 18.19.

EXAMPLE 2.—PREPARATION OF O-(α-ETHOXY-PROPIONYL)-1-SCOPOLAMINE METHYL BROMIDE

A. *O-(α-ethoxypropionyl)-1-scopolamine*

To a suspension of 38.43 grams (0.1 mole) of 1-scopolamine hydrobromide (dried at sixty degrees centigrade in vacuo for six hours) in 100 milliliters of dry pyridine was added 20.5 grams (0.15 mole) of α-ethoxypropionyl chloride (Demolis and Kon, J. Chem. Soc., 1932, 2283). The mixture became warm and darkened. The solid dissolved, and after standing at room temperature for sixteen hours, the solution was distilled nearly to dryness under reduced pressure below thirty degrees centigrade. The resulting gum was mixed with 300 milliliters of cold ten percent sodium carbonate and extracted twice with ether. The aqueous solution was made strongly basic with sodium hydroxide and extracted twice more with ether. The extracts were combined and washed with water and then with saturated sodium chloride solution. The ether was removed by distillation under reduced pressure giving 42.1 grams of O-(α-ethoxypropionyl)-1-scopolamine as a brown oil.

B. *O-(α-ethoxypropionyl)-1-scopolamine methyl bromide*

To a cold solution of twenty grams of the above brown oily free base in fifty milliliters of methyl ethyl ketone was added about ten grams of methyl bromide. The flask was stoppered and clamped and allowed to stand at room temperature for three days. The resulting tan solid was collected on a filter, washed with methyl ethyl ketone and crystallized from a mixture of isopropyl and ethyl alcohols. Yield 18.54 grams of O-(α-ethoxypropionyl)-1-scopolamine methyl bromide, melting point 163–164 degrees centigrade, resolidifying and remelting at 170–171 degrees centigrade. This product was recrystallized from absolute ethanol giving 16.7 grams of white crystals, melting point 165–166 degrees centigrade, resolidifying and remelting at 170–171 degrees centigrade. A sample was dried at 100 degrees and 0.1 millimeter pressure for 4 and one-half hours, to give a melting point of 167–8 degrees centigrade followed by resolidifying and remelting at 172–3 degrees centigrade; $[\alpha]_D^{23}$ −24 degrees (1.061 percent in water).

*Anal.*—Calcd. for $C_{23}H_{32}BrNO_6$: C, 55.42; H. 6.47; Br, 16.04. Found: C, 55.68; H, 6.37; Br, 16.15.

EXAMPLE 3.—PREPARATION OF O-TRIMETHYL-ACETYL 1-SCOPOLAMINE METHYL BROMIDE

A. *D-trimethylacetyl 1-scopolamine*

To a suspension of 38.43 grams (0.1 mole) of dried 1-scopolamine hydrobromide in 100 milliliters of dry pyridine was added 18.1 grams (0.15 mole) of trimethylacetyl chloride [Meyer, Monats. 27, 36 (1906)]. The mixture became warm and the solid dissolved giving a yellow solution. After about one hour, crystals started to separate. The mixture was allowed to stand at room temperature for four days and was then dissolved in ice water, treated with 200 milliliters of ten percent sodium carbonate and extracted twice with ether. To the aqueous solution was added twenty milliliters of fifty percent sodium hydroxide and it was extracted twice again with ether. The extracts were combined, washed with water and saturated sodium chloride and dried over sodium sulfate. The solvent was removed under reduced pressure giving 43.3 grams of crude crystalline O-trimethylacetyl 1-scopolamine. A sample of 17.6 grams of this product was recrystallized from hexane giving twelve grams of nearly white crystals; melting point 92–3 degrees centigrade, $[\alpha]_D^{23}$ −27 degrees (0.517 percent in 95 percent ethanol). An additional yield of two grams was obtained from the filtrate; total yield fourteen grams (equivalent to 89 percent).

*Anal.*—Calcd. for $C_{22}H_{29}NO_5$: C, 68.19; H, 7.54; N, 3.62. Found: C, 68.28; H, 7.24; N, 3.69.

B. *O-trimethylacetyl 1-scopolamine hydrochloride*

Absolute ether was added to turbidity to a solution of 6.5 grams (0.0174 mole) of the above free base in 35 milliliters of ethanol and a slight excess of aqueous concentrated hydrochloric acid. The O-trimethylacetyl-1-scopolamine hydrochloride crystallized and was collected and dried, yield 6.84 grams (95 percent); melting point 217–218 degrees centigrade. A sample recrystallized from absolute ethanol had the same melting point; $[\alpha]_D^{23}$ −20 degrees (1.149 percent in water).

*Anal.*—Calcd. for $C_{22}H_{30}ClNO_5$: C, 62.33; H, 7.13; Cl, 8.36. Found: C, 62.37; H, 7.16; Cl, 8.33.

C. *O-trimethylacetyl 1-scopolamine methyl bromide*

To a cold solution of 25.7 grams of the crude O-trimethylacetyl 1-scopolamine in 65 milliliters of methyl ethyl ketone was added about twenty grams of cold methyl bromide. The flask was stoppered, clamped, and allowed to stand at room temperature for three days. The resulting crystalline solid was collected, and recrystallized from a mixture of methanol and ethanol giving 24.05 grams of O-trimethylacetyl 1-scopolamine methyl bromide, (85.6 percent based on the 1-scopolamine hydrobromide); melting point 207–209 degrees centigrade with decomposition, $[\alpha]_D^{23}$ −18 degrees (1.082 percent in water).

*Anal.*—Calcd. for $C_{23}H_{32}BrNO_5$: C, 57.26; H, 6.69; Br, 16.57. Found: C, 57.26; H, 6.48; Br, 16.71.

EXAMPLE 4.—PREPARATION OF O-(α-ETHYL-BUTYRYL)-1-SCOPOLAMINE METHYL BROMIDE

A. *O-(α-ethylbutyryl)-1-scopolamine*

To a suspension of 46.0 grams (012 mole) of anhydrous 1-scopolamine hydrobromide in 120 milliliters of dry pyridine was added 24.5 grams (0.18 mole) of α-ethylbutyryl chloride [M. Freund and P. Herrmann, Ber. 23, 189 (1890)]. The mixture became warm and a solid dissolved giving a red solution. After standing at room temperature for two days, most of the solvent was removed by distillation under reduced pressure below forty degrees centigrade. The residue was treated with ice water and 300 milliliters of ten percent aqueous sodium carbonate solution and was extracted twice with ether. The aqueous solution was then made strongly basic with sodium hydroxide solution and again extracted with ether. The ether extracts were combined, washed with water and saturated sodium chloride solution and dried over sodium sulfate. Distillation of the ether under reduced pressure left 58.8 grams of O-(α-ethylbutyryl)-1-scopolamine as a brown oil.

B. *O-(α-ethylbutyryl)-1-scopolamine methyl bromide*

To a cold solution of 20.0 grams of the crude free base in fifty milliliters of methyl ethyl ketone was added twenty grams of cold methyl bromide. The flask was stoppered, clamped, and allowed to stand at room temperature for forty hours. The resulting precipitate was collected and recrystallized from 200 milliliters of absolute ethanol giving 18.3 grams (90.4 percent over-all yield) of O-(α-ethylbutyryl)-1-scopolamine methyl bromide in the form of white crystals; melting point 177–179 degrees; $[\alpha]_D^{23}$ −19 degrees (1.0 percent in water).

*Anal.*—Calcd. for $C_{24}H_{34}BrNO_5$: C, 58.06; H, 6.90; Br, 16.10. Found: C, 58.02; H, 6.62; Br, 15.97.

EXAMPLE 5.—PREPARATION OF O-(β-CYCLOPENTYLPROPIONYL)-1-SCOPOLAMINE METHYL BROMIDE

A. *O-(β-cyclopentylpropionyl)-1-scopolamine*

To a suspension of 38.43 grams (0.1 mole) of dried 1-scopolamine hydrobromide in 100 milliliters of dry pyridine was added 24.05 grams (0.15 mole) of β-cyclopentylpropionyl chloride. The solid soon dissolved. After standing at room temperature for four days the red solution was distilled in vacuo nearly to dryness. The residue was mixed with 250 milliliters of cold ten percent sodium carbonate and extracted twice with ether. The aqueous solution was treated with twenty milliliters of fifty percent sodium hydroxide and again extracted with ether. The ether solutions were combined, washed with water and saturated sodium chloride solution and dried over sodium sulfate. The solvent was removed under reduced pressure giving 43.3 grams of O-(β-cyclopentylpropionyl)-1-scopolamine as a brown oily material.

B. *O-(β-cyclopentylpropionyl)-1-scopolamine methyl bromide*

To a cold solution of 25 grams of the crude free base in 75 milliliters of methyl ethyl ketone was added twenty grams of cold methyl bromide. The flask was stoppered and clamped, and allowed to stand at room temperature for two days. A gelatinous solid separated. To this was added 300 milliliters of dioxane and after shaking, warming and standing the solid was collected. The crude gummy solid was dissolved in a mixture of ethanol and methyl ethyl ketone and concentrated under reduced pressure until a solid started to separate. After cooling in the refrigerator the solid was collected giving 15.8 grams of light tan material having a melting point 164–166 degrees centigrade. This product was recrystallized from 200 milliliters of isopropyl alcohol giving 13.4 grams (45 percent based on the 1-scopolamine hydrobromide) of O-(β-cyclopentylpropionyl)-1-scopolamine methyl bromide as nearly white crystals; melting point 163–164 degrees centigrade, resolidifying and remelting at 170–173 degrees centigrade; $[\alpha]_D^{23}$ −23 degrees (1.021 percent in water).

*Anal.*—Calcd. for $C_{26}H_{36}BrNO_5$: C, 59.77; H, 6.95; Br, 15.30. Found: C, 59.95; H, 6.98; Br, 15.26.

EXAMPLE 6.—PREPARATION OF O-(α-ETHYLISOVALERYL)-1-SCOPOLAMINE METHYL BROMIDE

A. *O-(α-ethylisovaleryl)-1-scopolamine*

To a suspension of 19.22 grams (0.05 mole) of dried 1-scopolamine hydrobromide in fifty milliliters of dry pyridine was added 10.2 grams (0.0687 mole) of α-ethylisovaleryl chloride, which was prepared by the action of thionyl chloride on α-ethylisovaleric acid [A. W. Crossley and H. R. Le Sueur, J. Chem. Soc. 77, 83 (1900)]. The mixture became warm and red colored and the solid dissolved. After standing at room temperature for two days crystals had separated. The mixture was distilled nearly to dryness below 40 degrees centigrade under reduced pressure. The residue was mixed with 200 milliliters of ten percent aqueous sodium carbonate and extracted twice with ether. The aqueous solution was made strongly basic with sodium hydroxide and extracted twice more with ether. The ether solutions were combined, washed with water and saturated sodium chloride solution and dried over sodium sulfate. The solvent was removed below 40 degrees centigrade under reduced pressure giving 25 grams of O-(α-ethylisovaleryl)-1-scopolamine as a dark brown oily product.

B. *O-(α-ethylisovaleryl)-1-scopolamine hydrobromide*

To a solution of ten grams of this crude free base in twenty milliliters of absolute ethanol was added a slight excess of 48 percent aqueous hydrogen bromide. The solution was diluted with ether and the crude hydrobromide separated as a yellow solid which weighed 10.65 grams and had a melting point of 158–163 degrees centigrade. This product was recrystallized from about forty milliliters of isopropyl alcohol, giving 8.57 grams (85.1 percent) of nearly white crystals, melting point 179–181 degrees centigrade. A second recrystallization from about 100 milliliters of methyl ethyl ketone gave 7.59 grams of O-(α-ethylisovaleryl)-1-scopolamine hydrobromide as white crystals, melting point 182–183 degrees centigrade, $[\alpha]_D^{23}$ −19 degrees (1.101 percent in water).

*Anal.*—Calcd. for $C_{24}H_{34}BrNO_5$: C, 58.06; H, 6.90; Br, 16.10. Found: C, 58.31; H, 7.18; Br, 15.83.

C. *O-(α-ethylisovaleryl)-1-scopolamine methyl bromide*

To a cold solution of 15 grams of the above crude O-(α-ethylisovaleryl)-1-scopolamine free base in 35 milliliters of methyl ethyl ketone was added eighteen grams of cold methyl bromide. The flask was stoppered, clamped, and allowed to stand at room temperature for three days. The resulting crystals were collected, washed with methyl ethyl ketone and ether and dried giving 17.55 grams of tan colored crystals, melting point 168–171 degrees centigrade with decomposition. This material was recrystallized from about 100 milliliters of absolute ethanol giving 13.66 grams (89.1 percent) of O-(α-ethylisovaleryl)-1-scopolamine methyl bromide as white crystals, melting point 182.5–184 degrees centigrade with decomposition; $[\alpha]_D^{23}$ −17 degrees (0.994 percent in water).

*Anal.*—Calcd. for $C_{25}H_{36}BrNO_5$: C, 58.82; H, 7.11; Br, 15.66. Found: C, 58.85; H, 6.83; Br, 15.63.

Although the examples describe the use of the 1-scopolamine and the preparation of the corresponding esters of N-methyl 1-scopolamine quaternary ammonium salts, it is to be understood that the corresponding d- and d,1-scopolamines can likewise be employed as starting materials and when so employed the corresponding esters of N-methyl d- and d,1-scopolamine quaternary ammonium salts are obtained.

The novel compounds of this invention can be combined with solid or liquid pharmaceutical carriers and formulated into the form of tablets, powder packets, or capsules, or dissolved or suspended in suitable solvents, for oral or parenteral administration to human beings suffering from gastro-intestinal disorders. A suitable dosage unit is a tablet having the following composition:

| | | |
|---|---|---|
| O-acetyl l-scopolamine methyl bromide | milligrams | 5 |
| Lactose | grains | 1.3 |
| Sucrose | do | 0.04 |
| Starch | do | 0.075 |
| Calcium stearate | do | 0.02 |

A batch of 1000 of such five milligram tablets is prepared by the usual procedure comprising intimately mixing five grams of O-acetyl l-scopolamine methyl bromide with 84 grams of lactose and granulating with an aqueous solution of 2.6 grams of sucrose. After drying, the granules are lubricated with 4.9 grams of starch and 1.3 grams of calcium stearate and compressed into tablets on a tablet machine. The other esters of N-methylscopolamine quaternary ammonium salts of this invention can be substituted for the O-acetyl l-scopolamine methyl bromide in this formulation.

It is to be understood that the invention is not to be limited to the exact details of operation or exact compounds shown and described, as obvious modifications and equivalents will be apparent to one skilled in the art, and the invention is therefore to be limited only by the scope of the appended claims.

I claim:

1. A compound having the following general formula:

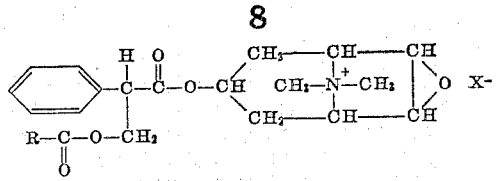

wherein R is selected from the group consisting of lower alkyl, lower cycloalkylalkyl and lower alkoxyalkyl and X is a pharmacologically acceptable anion.

2. A lower alkanoyl ester of an N-methyl scopolamine quaternary ammonium halide.

3. A lower alkanoyl ester of N-methyl scopolamine quaternary ammonium bromide.

4. O-acetyl l-scopolamine methyl bromide.

5. O - (α - ethoxypropionyl) - l - scopolamine methyl bromide.

6. O-(α-ethylbutyryl)-l-scopolamine methyl bromide.

7. O - (β-cyclopentylpropionyl)-l-scopolamine methyl bromide.

8. O-(α-ethylisovaleryl)-l-scopolamine methyl bromide.

References Cited in the file of this patent

FOREIGN PATENTS 79,864    Germany _____ Feb. 18, 1895

OTHER REFERENCES

Manske et al.: The Alkaloids, vol. 1, pp. 302–7, 350–2 (1950).